United States Patent
Godwin et al.

(10) Patent No.: US 7,292,547 B1
(45) Date of Patent: Nov. 6, 2007

(54) DEVICE AND METHOD FOR NODAL MULTIPLE ACCESS INTO COMMUNICATIONS CHANNELS

(75) Inventors: John P. Godwin, Los Angeles, CA (US); Ernest C. Chen, San Pedro, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 1084 days.

(21) Appl. No.: 10/153,250

(22) Filed: May 22, 2002

(51) Int. Cl.
*H04B 7/212* (2006.01)
*H04J 3/06* (2006.01)

(52) U.S. Cl. .................. 370/324; 370/503; 370/516
(58) Field of Classification Search ............... None
See application file for complete search history.

(56) References Cited

U.S. PATENT DOCUMENTS

| | | | | |
|---|---|---|---|---|
| 4,901,307 A | | 2/1990 | Gilhousen et al. | |
| 5,454,007 A | * | 9/1995 | Dutta | 375/322 |
| 5,596,439 A | * | 1/1997 | Dankberg et al. | 398/35 |
| 5,712,850 A | * | 1/1998 | Elia et al. | 370/326 |
| 5,828,947 A | * | 10/1998 | Michel et al. | 455/13.4 |
| 5,839,053 A | * | 11/1998 | Bosch et al. | 455/13.1 |
| 5,881,097 A | | 3/1999 | Lilleberg et al. | |
| 6,011,952 A | * | 1/2000 | Dankberg et al. | 455/24 |
| 6,052,554 A | * | 4/2000 | Hendricks et al. | 725/109 |
| 6,072,785 A | | 6/2000 | Ho | |
| 6,094,421 A | | 7/2000 | Scott | |
| 6,097,706 A | | 8/2000 | Fielding et al. | |
| 6,104,708 A | * | 8/2000 | Bergamo | 370/320 |
| 6,226,492 B1 | * | 5/2001 | Tsuda | 455/12.1 |
| 6,768,900 B2 | * | 7/2004 | Dent et al. | 455/114.1 |
| 6,823,170 B1 | * | 11/2004 | Dent | 455/13.3 |
| 6,859,641 B2 | * | 2/2005 | Collins et al. | 455/63.1 |
| 6,944,139 B1 | * | 9/2005 | Campanella | 370/315 |

* cited by examiner

*Primary Examiner*—Andrew C. Lee
(74) *Attorney, Agent, or Firm*—Gates & Cooper LLP

(57) ABSTRACT

A nodal division multiple access technique for multiple access to a communications channel such as a satellite transponder. The present invention provides multiple access into a communications channel where each accessing site utilizes one signal from a composite amplitude/phase digital signal constellation, such that demodulators receive the composite signal without changes in the system design related to the multiple access operation.

18 Claims, 4 Drawing Sheets

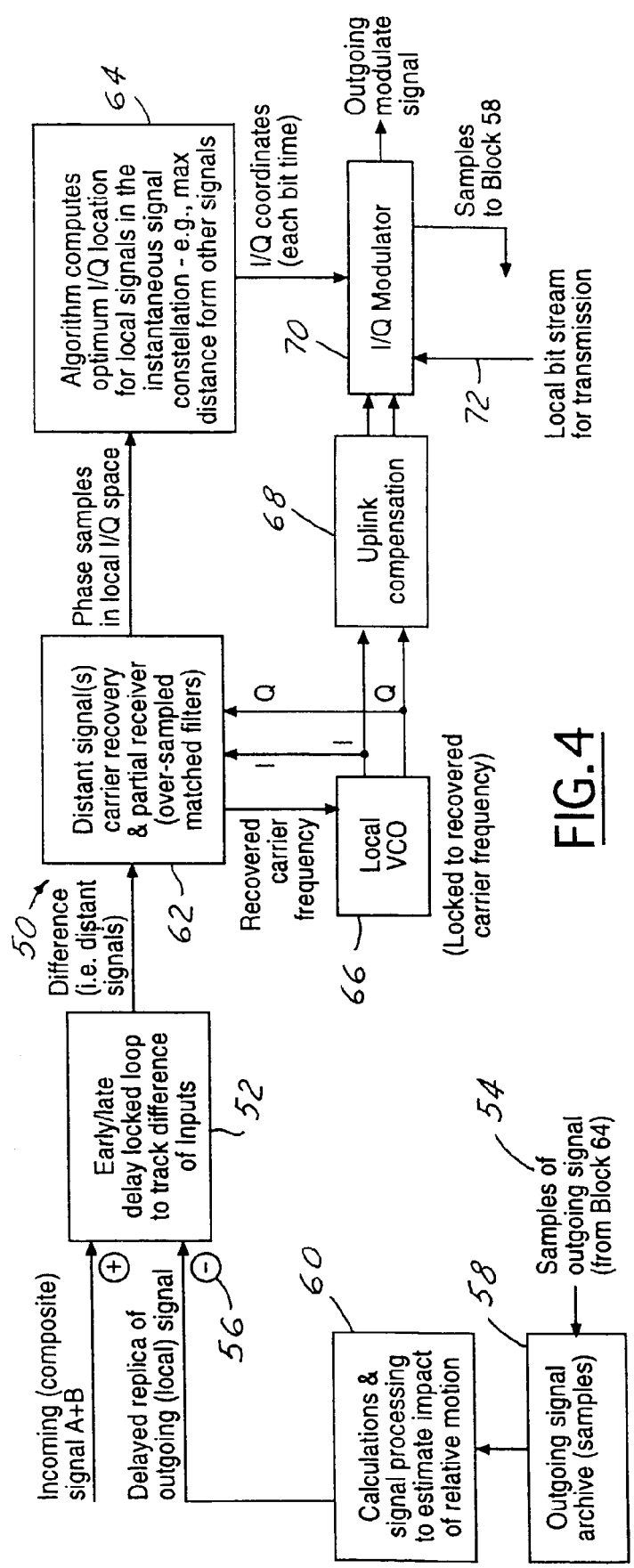

DEVICE AND METHOD FOR NODAL MULTIPLE ACCESS INTO COMMUNICATIONS CHANNELS

TECHNICAL FIELD

The present invention relates generally to a system and method for multiple access to a given transponder and more particularly to multiple access in satellite communications.

BACKGROUND OF THE INVENTION

Communications channels, such as the RF communications channel represented by a geosynchronous communications satellite transponder, are an important, economically valuable resource. A multitude of schemes have been developed for efficient modulation and coding of a single carrier using a communications channel and for multiple access techniques where multiple carriers share a channel. In multiple access, the typical design case involves transmissions from dispersed geographic locations where any one site has a capacity demand less than the total capacity available, but where the aggregate demand from all sites is equal to the total capacity.

In the specific case of satellite communications, multiple access to a given transponder has been achieved using frequency division multiple access (FDMA), time division multiple access (TDMA), code division multiple access (CDMA), and various combinations of these techniques. The FDMA, TDMA, CDMA and variations thereof all require specific equipment features at both the transmit and the receive ends of the system.

In a satellite system, including a so-called geostationary system, the satellite is always moving with respect to the modulators and demodulators. The geometry and satellite motion causes slowly varying distances between the transmit sites and the satellite and between the satellite and the receive sites. In turn, the varying distance along the line-of-sight causes changes in carrier frequency, and hence phase, due to Doppler. Since the multiple access signals of interest herein share the satellite transponder and the downlink path, the key issues are the differences in paths of the uplink signals. These differences are primarily due to slight differences in the geometry between uplink site and the satellites and slight differences in signal propagation through the atmosphere such as phase scintillation.

These variations present design challenges for conventional multiple access techniques such as FDMA, TDMA and CDMA. Any new technique must also accommodate the time-varying geometry that occurs in a communications satellite system.

SUMMARY OF THE INVENTION

The present invention is a system and method for communications signal processing including the capability to handle time-varying effects such as that which occur in a communications satellite system. The present invention provides multiple access into a communications channel where each accessing site utilizes one signal from a composite amplitude/phase modulated digital signal constellation, such that the demodulators receive the composite signal without changes in the receiver design related to the multiple access operation.

The present invention permits nodal division multiple access (NDMA) where standard modulation techniques are used but where innovative processing at the modulator locations permits multiple carriers to share a single communications channel, such as a satellite transponder. With modern signal processing technology, the implementation at the modulator end is practical and economical. No changes are necessary in the demodulators. This is a very important advantage in asymmetrical applications, such as direct broadcast satellite (DBS), where there are many more demodulators than modulators.

According to the NDMA technique of the present invention, the user receivers are generally the same as receivers for certain modulation formats without multiple access. NDMA can directly utilize the major body of theory and practice already available in digital communications, particularly in amplitude phase shift keying (APSK). NDMA can be used as a network evolution technique in that all deployed receivers would have the capability to demodulate any appropriate signal, but as the network evolves the transmitted signal becomes a multiple access composite of signals from different geographic points.

As a specific application, the invention could be utilized in an advanced system for DBS re-broadcast of local television signals. In existing systems, the local television signal is transported, by terrestrial means, to a small number of major satellite uplink sites. Each of the uplink sites aggregates channels into groups matching the capacity of a single satellite transponder. Each uplink carrier then is a "single access" carrier from one of the major satellite sites to a direct broadcast satellite (DBS) transponder.

According to the NDMA system and method described herein, the local channels can be uplinked from less expensive sites nearer to the television signal's point of origin. For example, the capacity of a transponder could be shared between two local television markets with an uplink in each market. The NDMA invention eliminates the terrestrial transmission costs to a more complex, distant uplink facility.

It is an object of the present invention to utilize PDMA in satellite communications. It is another object of the present invention to utilize PDMA as a network evolution technique. It is still another object of the present invention to permit a new signal to be uplinked from a new geographic site distant from an original uplink site.

A further object of the present invention is to provide a method for making a transmitted signal become a composite of multiple signals from different geographic sites.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings:

FIG. 4 is a diagram of a dynamic geometry local modulating subsystem;

FIG. 5 is a signal constellation of a composite input signal according to the present invention;

FIG. 6 is a signal constellation of the composite input signal after removal of the local signal according to the present invention;

FIG. 7 is a signal constellation of an estimate of distant signal coordinates according to the present invention;

FIG. 8 is a signal constellation of local coordinates according to the present invention;

FIG. 9 is a signal constellation of the output signal according to the present invention.

DETAILED DESCRIPTION OF PREFERRED EMBODIMENTS

Some background material and terms are defined herein for the detailed description of the preferred embodiments of the present invention. A "local transmit site" is one of several sites which transmit signals in multiple access with other distant sites into a common channel. Most of the required signal processing is described herein with regard to a single "local" site. Each local site transmits a modulated "carrier" or "signal" which, after the common channel, is a part of the "composite" signal. The term "carrier" denotes an unmodulated transmission.

In-phase (I) and quadrature (Q) carrier and signal components are utilized throughout the present invention. Each local signal is described by its location in the I-Q coordinate space of the underlying carrier.

The following description applies to a 4PSK satellite communications application. With a 4PSK (QPSK) modulation design, the present invention permits multiple access from two locations, with each transmitting a 2PSK signal. Other applications can be generalized from this particular case. For example, with 16QAM, the invention permits NDMA from two sites, each with 4PSK modulation or from as many as four sites each with 2PSK or 4PSK modulation. It should also be noted that the fundamentals of the invention apply to any system and modulation where the modulations can be combined within the channel and where the distant carriers can be appropriately controlled. For example, the present invention applies to amplitude and phase modulations if the linearity of the communications channel permits quasi-linear superposition of the modulations from the different transmit locations.

A variety of forward error control (FEC) techniques may be used with the signals described herein. For the NDMA system described herein, the FEC design is largely independent and, in fact, an important feature of the invention in that the FEC scheme may be different for each accessing signal. For example, an NDMA system may start with a 4PSK signal with one FEC scheme and then later add a 2PSK signal with a different, more advanced FEC.

Figure 1:
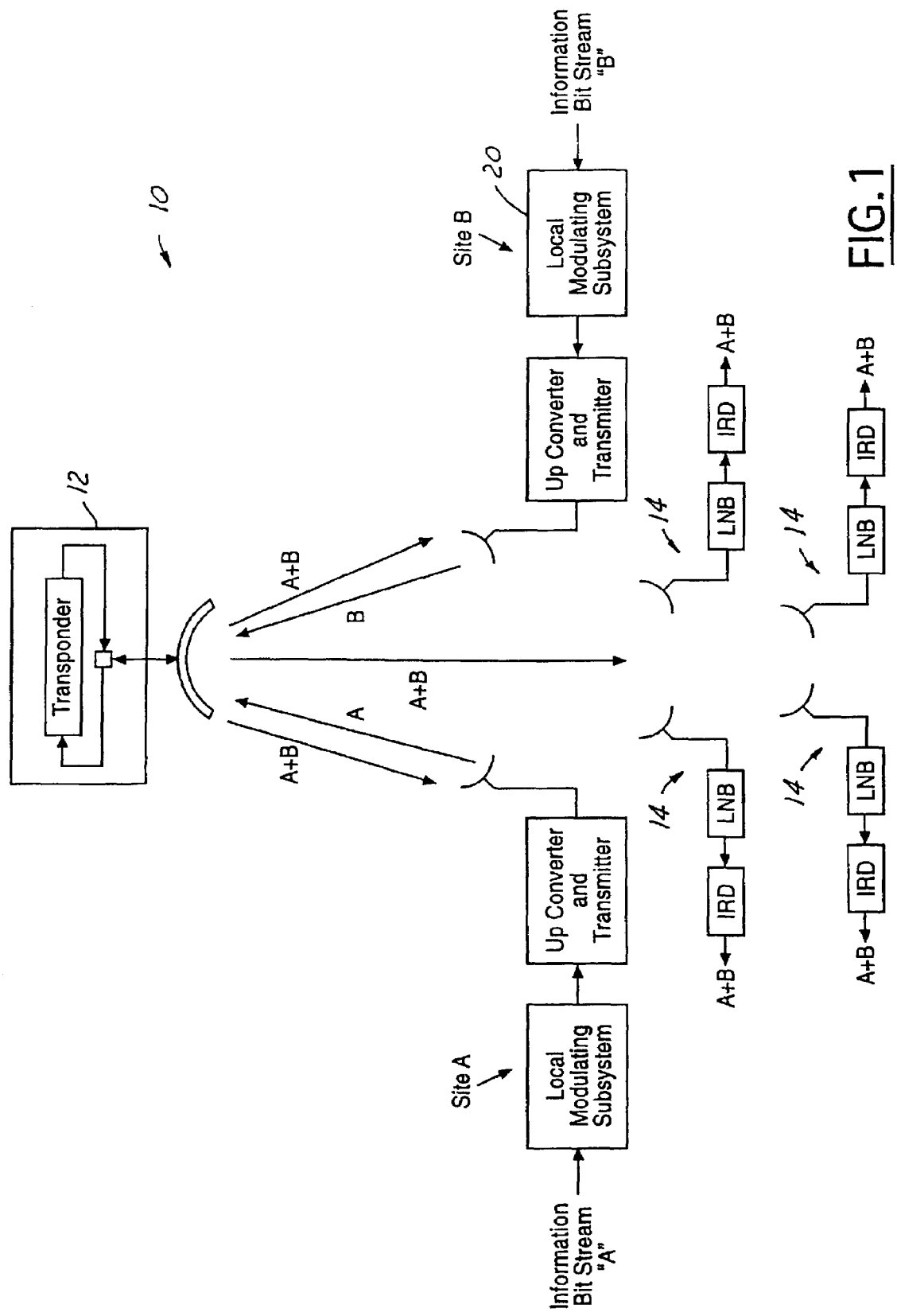
FIG. 1 is a diagram of a static geometry system having a terrestrial repeater.

FIG. 1 is a block diagram of a static geometry terrestrial repeater system 10 using 4PSK for multiple access to a terrestrial repeater. The present invention is applicable to static geometry applications, such as a terrestrial repeater. Another example of a static geometry application is a satellite whose motion is not significant and the Doppler effect is negligible. There are two originating sites, site A and site B. Each of the two originating sites transmits 2PSK to a transponder 12. Transponder 12 transmits a composite signal, A+B, to Site A, Site B, and a plurality of other, much simpler, receiving sites 14. The composite signal A+B is also used as a frequency and phase reference signal according to the present invention.

Figure 2:
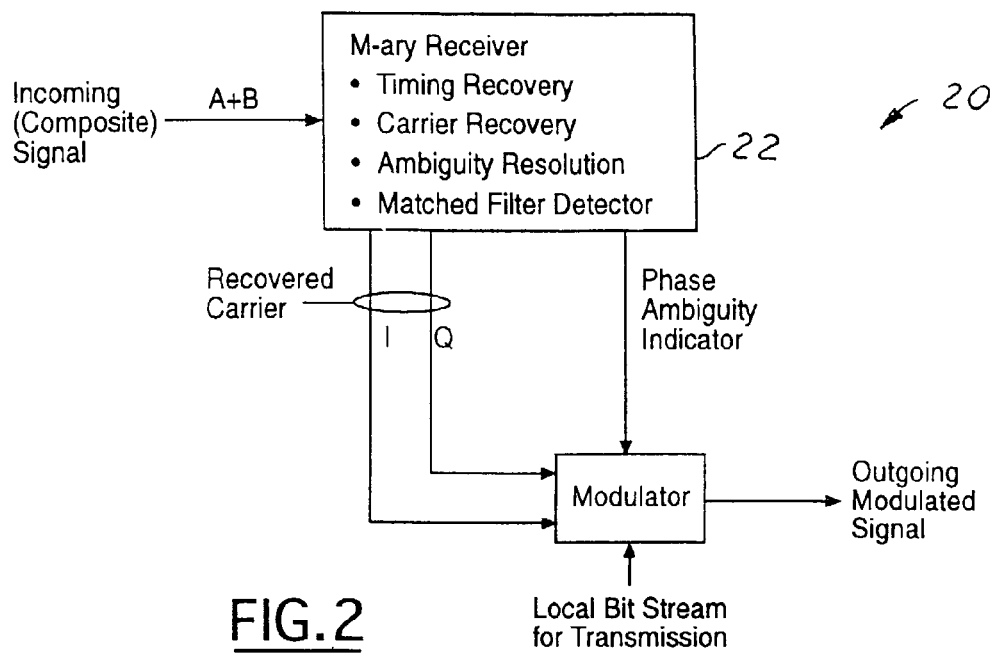
FIG. 2 is a diagram of a static geometry local modulating subsystem.

FIG. 2 is the local modulating subsystem 20 for a static example, which is located at either Site A or Site B. The incoming composite signal A+B is received at a M-ary receiver 22 where it is used as a timing, frequency and phase reference. The composite signal A+B is recovered from the transponder and converted into In-phase and Quadrature components. Ambiguity resolution is performed to determine a reference for the phase of the signal. The converted recovered carrier and the phase ambiguity indicator are sent to the modulator, where the information bit stream is also fed. The outgoing modulated signal is output from the modulator.

The static geometry application shown in FIGS. 1 and 2 is not particularly challenging for the present invention of NDMA, because the geometry is fixed and the differential propagation impairments for the paths A and B are small.

Figure 3:
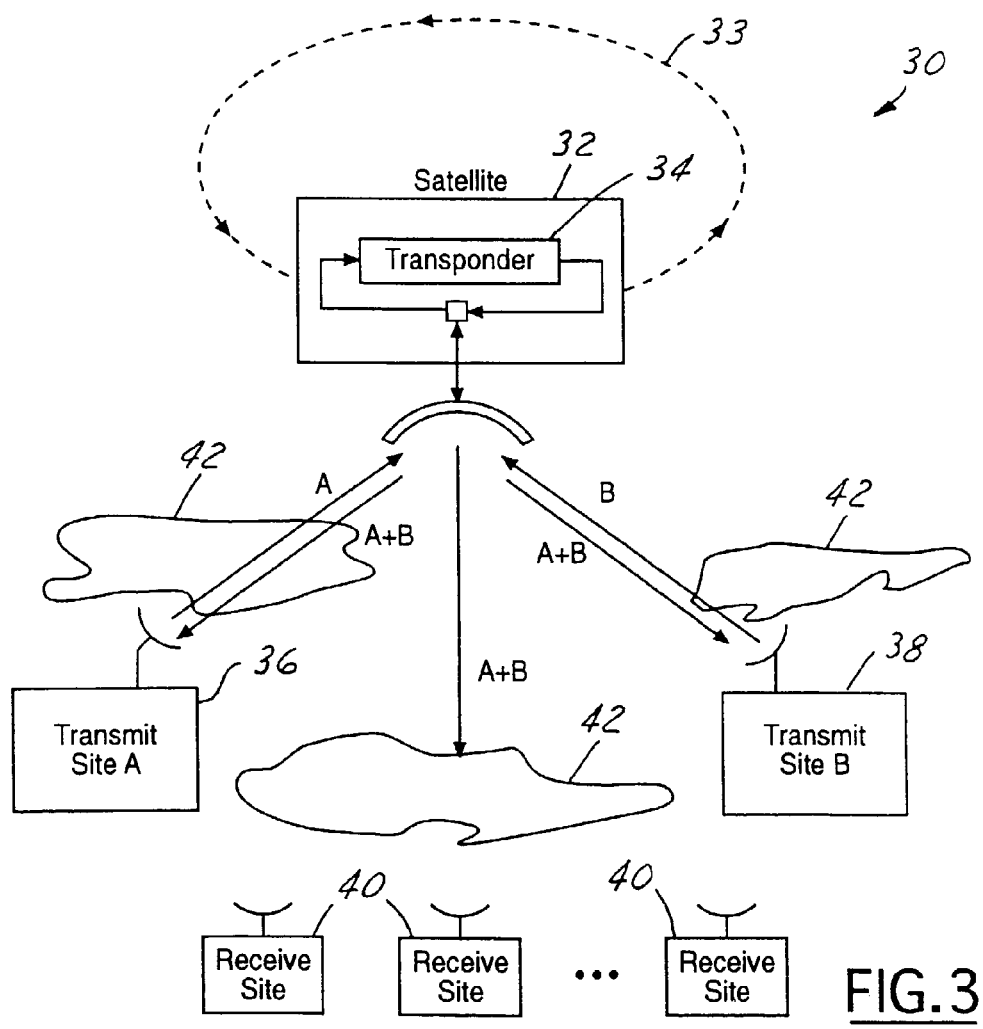
FIG. 3 is a system diagram of a dynamic geometry system.

FIG. 3 is a block diagram of a system 30 with a time-varying, dynamic geometry involving an orbiting communications satellite 32. The relative motion of the satellite 32, and transponder 34, is shown by a dashed line 33 with arrows indicating the direction of motion. Transmit site A 36 transmits signal A to the transponder 34. Transmit site B 38 transmits signal B to the transponder. A composite signal A+B is transmitted from the transponder back to each of sites A 36 and B 38. The composite signal A+B is also transmitted to a plurality of receive sites 40. The signals are transmitted and received through a variety of atmospheric effects 42.

The application shown in FIG. 3 introduces two new effects to provide sources of timing, frequency and phase instability. In contrast to the static geometry application shown in FIG. 1, the satellite application in FIG. 3 introduces variations in the signal. Because the satellite 32 is not perfectly "geostationary", a small relative motion with respect to the transmit sites 36, 38 gives timing, frequency and phase changes. Also, since the different uplink signals do not follow the same paths through the atmosphere, it is assumed that small differential delays, or phase changes, will occur.

FIG. 4 is a block diagram of the local modulating subsystem 50 for the dynamic geometry system of FIG. 3. FIG. 4 shows the signal processing used at each of the transmit sites. With reference to FIG. 4 it should be noted that 4PSK modulation is shown, however, with refinements the architecture shown may be generalized and applied to amplitude/phase shift keying such as 16QAM. In the description with respect to FIGS. 4 through 9, the concept of a "local I/Q coordinate space" is used to collect incoming signal measurements and synthesize outgoing signals. It should be noted that the I/Q space is only a localized signal processing implementation and it does not directly relate to the composite signal constellation. The local I/Q coordinates are the in-phase and out-of-phase components of a given signal with respect to the local VCO reference.

Referring to FIG. 5, a signal constellation 100 for the composite signal A+B is shown. The composite signal A+B is input to the local modulating subsystem 50 of FIG. 4. The local modulation is removed 52 from the composite signal A+B. This is accomplished by coarse and fine synchronization processes wherein a replica of the outgoing signal 54 is subtracted 56 from the composite signal A+B. The synchronization processes drive toward minimization of the difference of the signals and hence provide a "clean" replica of the distant signals. The coarse part of the synchronization process is open loop and uses an archive 58 of the outgoing signal 54 and parameters of the satellite orbit and satellite to local uplink geometry.

Using the orbit parameters and geometric data, straightforward calculations provide an estimate 60 of the satellite-to-ground distance, and hence signal delay and the time-rate-of-change of the distance and hence the timing and frequency shift. Since the roundtrip delay is less than 300 msec, the signal archive storage requirements are modest. An example of a fine tracking loop is an early/late delay-locked loop that removes 52 local modulation from the composite signal A+B. The loop is of the type used in spread-spectrum communications systems, an example of which is described in Digital Communications and Spread Spectrum Systems, R. E. Ziemer and R. L. Peterson, Macmillan, 1985, specifically at Chapter 9, pages 419 through 483, which is incorporated herein by reference. FIG. 6 is a signal constellation 102 of the signal after the local signal has been removed.

Referring back to FIG. 4, the coarse blocks 58, 60 and the fine block 52 will maintain lock for reliable operation except, perhaps, immediately following a satellite orbital maneuver. Therefore, in terms of customer satisfaction, it is suggested that orbital maneuvers be carried out during low customer interest, such as the early morning hours, to minimize the impact on perceived system availability.

The carrier A+B is recovered 62 from the input modulation. The carrier is a composite of the carriers from the plurality of distant sites. Since all of the uplink sites have this circuitry, all will continuously drive towards a common frequency. Bit decisions are not made at this signal processing stage. Signal samples are output in the local I/Q coordinate space. FIG. 7 is a signal constellation 104 of the distant signal coordinates that are estimated.

Referring back to FIG. 4, signal samples are examined and at each bit time, the optimum location for local signals is recomputed 64 in local I/Q coordinates for the local M-ary signals. An algorithm is used to maximize the distance between the local signals and the signals received from distant sites. Since all uplink sites have the same circuitry, they all will continuously drive toward an optimum signal constellation. For example, FIG. 8 shows boundaries 106 for the signal constellation. If the received distant signal shown in constellation 104 of FIG. 7 is slowing rotating in the local I/Q space, the algorithm will cause the outgoing modulation to rotate appropriately to maintain roughly the distance intended in the M-ary modulation design shown by the boundaries 106 in FIG. 8.

Referring again to FIG. 4, orbital parameters and geometric data are used to pre-distort or compensate the outgoing signal 66 such that the effects of the changing geometry are removed 68. The local signal constellation 108 is shown in FIG. 9. Referring back to FIG. 4, the compensated signal 68 and the I/Q coordinates of the optimum location 64 and the local bit stream for transmission 72 are used to create 70 the outgoing modulated signal. The I/Q references from the local voltage control oscillator as modified at block 68 are used to create 70 the outgoing phase modulated signal. The implementation described with reference to FIG. 4 occurs at each uplink site. For example, with 16QAM, the implementation of FIG. 4 would be deployed at up to four sites, with each site transmitting a 2PSK signal.

Figure 10:
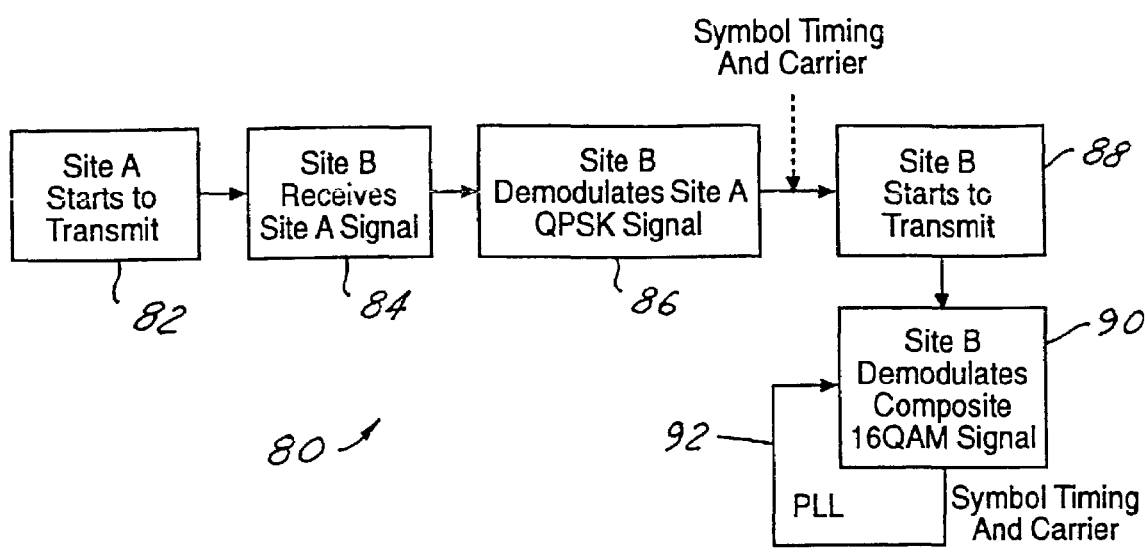
FIG. 10 is a system diagram of an alternative embodiment of the present invention.

In an alternative embodiment, shown in FIG. 10, there is no need for an outgoing signal archive. In the embodiment shown in FIG. 10 an initiating sequence 80 is implemented. Site A is the "master" site 82 and transmits first. Site B, called the "slave" site 84, receives the signal from site A by way of the satellite. Site B demodulates 86 the signal from site A 82 to obtain symbol timing and signal carrier frequency information about the signal from site A. Slaving to this information, site B then transmits 88 its own signal with synchronized symbol timing and a carrier frequency equal to the received frequency. The two signals make a new composite signal. For example, site A transmits a 4 PSK signal and site B transmits a 4 PSK signal, their combination produces a 16 QAM signal as a composite signal.

Upon receiving the composite signal, Site B continuously tracks 90 symbol timing and carrier frequency errors between the two signals with a phase locked loop 92 to line up symbol timing and carrier phase with respect to the signal transmitted by Site A, by optimizing the placement of individual signal nodes within the composite constellation. Synchronization of symbol timing and carrier frequency/phase is maintained with the phase locked loop. In this regard, there is no need to store signals for cancellation. It is possible that additional slave sites be sequentially added to transmit higher-order modulation signals.

The invention covers all alternatives, modifications, and equivalents, as may be included within the spirit and scope of the appended claims.

What is claimed is:

1. A method for multiple access to a communications channel on a satellite comprising the steps of:
   transmitting a first modulated signal from a first site to a transponder;
   transmitting at least a second modulated signal from at least a second site to said transponder;
   transmitting a composite signal of said first and second signals to at least one receive location;
   modulating a carrier of said composite signal with an information bit stream by removing local modulation from said incoming composite signal by applying coarse and fine synchronization processes, determining an estimate of satellite-to-ground distance and hence signal delay time, determining a time-rate-of-change of said satellite-to-ground distance and hence carrier frequency shift, using said estimate to modify an outgoing signal thereby defining a replica of said outgoing signal, and subtracting said replicated signal from said composite signal, said outgoing signal being selected from a database of outgoing signals stored in an archive; and
   transmitting said outgoing signal from said at least two sites.

2. The method as claimed in claim 1 further comprising the step of using said composite signal as a local carrier reference for frequency and phase reference at one of said at least two transmit sites.

3. The method as claimed in claim 2 further comprising the steps of:
   collecting composite signal measurements; and
   synthesizing outgoing signals.

4. The method as claimed in claim 3 further comprising the steps of:
   recovering a frequency of said composite signal; and
   converting said recovered composite signal into In-phase and Quadrature components thereby defining a local I/Q coordinate space for signal processing at one of said at least two transmit sites and wherein said local I/Q coordinate space is determined with respect to a local voltage control oscillator reference.

5. The method as claimed in claim 1 further comprising the step of applying a fine tracking loop for tracking differences in said composite signal.

6. The method as claimed in claim 5 wherein said fine tracking loop further comprises an early/late delay locked loop.

7. The method as claimed in claim 4 wherein said step of modulating said local carrier reference further comprises determining an optimum I/Q location for said modulating signal.

8. The method as claimed in claim 7 further comprising the step of maximizing the distance between signals in said composite signal, a local signal and a signal from said at least a second site.

9. The method as claimed in claim 1 wherein said step of transmitting an outgoing signal further comprises the step of compensating said outgoing signal to remove the effects of a changing geometry for said satellite.

10. The method as claimed in claim 9 wherein said step of compensating said outgoing signal further comprises using orbital parameters and geometric data to compensate said outgoing signal.

11. The method as claimed in claim 1 further comprising the steps of:
receiving said first modulated signal at said at least a second site;
obtaining a frequency of said first modulated signal; and
wherein said step of transmitting a second modulated signal further comprises generating a carrier signal having a frequency equal to said frequency of said first modulated signal.

12. The method as claimed in claim 11 further comprising the step of tracking carrier frequency errors between said first and second carrier signals using a phase locked loop.

13. A nodal division multiple access method for multiple access to a satellite communications channel comprising the steps of:
utilizing a modulation scheme having an M-ARY phase/amplitude signal constellation;
transmitting a first modulated signal from a first site to a transponder;
transmitting at least a second modulated signal from at least a second site to said transponder;
transmitting a composite signal of said first and second modulated signals to at least one receive location;
removing, at one of said at least two transmit sites, local modulation from said incoming composite signal;
recovering a frequency of said composite signal;
converting said composite signal into In-phase and Quadrature components, thereby defining a local I/Q coordinate space for signal processing at one of said at least two transmit sites and wherein said local I/Q coordinate space is determined with respect to a local voltage control oscillator reference;
determining an optimum I/Q location for said composite signal by maximizing a distance between signals in said composite signal, a local signal and a signal from said at least a second site;
using geometric data to remove effects of a changing geometry for said transponder from said composite signal;
modulating said composite signal with an information bit stream to define an outgoing modulate signal; and
transmitting said outgoing modulated signal.

14. The method as claimed in claim 13 wherein said step of removing local modulation further comprises the steps of:
creating a replica of said outgoing signal; and
subtracting said replicated signal from said composite signal.

15. The method as claimed in claim 14 wherein said step of replicating said outgoing signal further comprises the steps of:
determining an estimate of transponder-to-ground distance, signal delay time, time-rate-of-change of said transponder-to-ground distance, and frequency shift; and
using said estimate to define said replicated signal.

16. A nodal division multiple access method for multiple access to a satellite communications channel comprising the steps of:
utilizing a modulation scheme with an M-ARY phase/amplitude signal constellation;
transmitting a first modulated signal from a first site to a transponder;
receiving said first modulated signal at said at least a second site;
obtaining a frequency of said first modulated signal;
transmitting at least a second modulated signal having a frequency equal to said frequency of said first modulated signal from at least a second site to said transponder;
transmitting a composite signal of said first and second carriers to at least one receive location;
removing, at one of said at least two transmit sites, local modulation from said incoming composite signal;
recovering a frequency of said composite signal;
converting said composite signal into In-phase and Quadrature components, thereby defining a local I/Q coordinate space for signal processing at one of said at least two transmit sites and wherein said local I/Q coordinate space is determined with respect to a local voltage control oscillator reference;
determining an optimum I/Q location for said composite signal by maximizing a distance between signals in said composite signal, a local signal and a signal from said at least a second site;
using orbital geometric data to remove effects of a changing geometry for said transponder from said composite signal;
modulating said composite signal with an information bit stream to define an outgoing modulate signal; and
transmitting said outgoing modulated signal.

17. The method as claimed in claim 16 wherein said step of removing local modulation further comprises the steps of:
replicating said outgoing signal defining a replicated signal; and
subtracting said replicated signal from said composite signal.

18. The method as claimed in claim 17 wherein said step of replicating said outgoing signal further comprises the steps of:
determining an estimate of transponder-to-ground distance, signal delay time, time-rate-of-change of said transponder-to-ground distance, and frequency shift; and
using said estimate to define said replicated signal.

* * * * *